(12) United States Patent
Perfetta et al.

(10) Patent No.: US 12,339,193 B2
(45) Date of Patent: Jun. 24, 2025

(54) SYSTEM AND METHOD FOR BALANCING A GIMBALED SYSTEM

(71) Applicant: The Boeing Company, Chicago, IL (US)

(72) Inventors: Richard A. Perfetta, Black Lick, OH (US); Craig A. Brunstetter, Heath, OH (US)

(73) Assignee: The Boeing Company, Arlington, VA (US)

( * ) Notice: Subject to any disclaimer, the term of this patent is extended or adjusted under 35 U.S.C. 154(b) by 868 days.

(21) Appl. No.: 17/527,047

(22) Filed: Nov. 15, 2021

(65) Prior Publication Data

US 2023/0341287 A1   Oct. 26, 2023

Related U.S. Application Data

(60) Provisional application No. 63/127,076, filed on Dec. 17, 2020.

(51) Int. Cl.
| | | |
|---|---|---|
| *G01M 1/32* | (2006.01) | |
| *G01C 19/08* | (2006.01) | |
| *G06F 17/11* | (2006.01) | |
| *G06F 17/18* | (2006.01) | |

(52) U.S. Cl.
CPC ............. *G01M 1/32* (2013.01); *G01C 19/08* (2013.01); *G06F 17/11* (2013.01); *G06F 17/18* (2013.01)

(58) Field of Classification Search
CPC .......... G01M 1/32; G01M 1/16; G01C 19/08; G06F 17/11; G06F 17/18; F16M 11/123; F16M 11/18; G11B 5/4826
See application file for complete search history.

(56) References Cited

U.S. PATENT DOCUMENTS

| | | | | |
|---|---|---|---|---|
| 5,837,962 A | * | 11/1998 | Overbeck | .......... B23K 26/0665 |
| | | | | 219/121.75 |
| 10,202,208 B1 | * | 2/2019 | Sanyal | .................... B64G 1/286 |
| 2007/0027590 A1 | * | 2/2007 | Liu | ......................... G01C 25/00 |
| | | | | 701/13 |
| 2007/0080858 A1 | * | 4/2007 | O'Brien | .................. B64G 1/244 |
| | | | | 342/358 |
| 2007/0080859 A1 | * | 4/2007 | Tekawy | ................... G01S 19/02 |
| | | | | 342/357.395 |

(Continued)

*Primary Examiner* — Mohammad K Islam
(74) *Attorney, Agent, or Firm* — Harrity & Harrity, LLP

(57) ABSTRACT

A method of balancing a gimbaled system having a gimbal operatively connected with a motor configured to control a rotation of the gimbal, wherein the gimbal has predetermined compensation locations thereon. The method includes tumbling the gimbal through a gravity field using the motor, sensing motor control current data from the motor, applying a polynomial fit filter to the motor control current data to produce smoothed current data, determining from the smoothed current data an imbalance condition of the gimbal characterized by an imbalance torque and an imbalance angle, and applying an optimization algorithm to determine an optimized combination of one or more compensating weights disposed at one or more of the predetermined compensation locations, wherein the optimized combination is effective to compensate for the imbalance condition. A system for balancing the gimbaled system is also disclosed.

20 Claims, 6 Drawing Sheets

(56) References Cited

U.S. PATENT DOCUMENTS

| | | | |
|---|---|---|---|
| 2012/0083347 A1* | 4/2012 | Trui | F16M 11/18 |
| | | | 472/57 |
| 2014/0260714 A1* | 9/2014 | Vallery | G01C 19/04 |
| | | | 74/5.37 |
| 2015/0116862 A1* | 4/2015 | Shen | G11B 5/59627 |
| | | | 360/77.02 |
| 2020/0398430 A1* | 12/2020 | Mohan | G05D 1/0274 |

* cited by examiner

SYSTEM AND METHOD FOR BALANCING A GIMBALED SYSTEM

CROSS-REFERENCE TO RELATED APPLICATIONS

This application claims priority to, and the benefit of, U.S. Provisional Patent Application No. 63/127,076 filed Dec. 17, 2020, which is hereby incorporated by reference in its entirety.

INTRODUCTION

This disclosure relates to systems and methods for balancing a gimbaled system.

Gimbaled systems are frequently used for applications such as motion control, image stabilization and navigation. For example, an inertial measurement unit (IMU) may utilize a multi-gimbal arrangement to assist with navigation in aircraft and missile systems. Gimbaled systems typically include one or more gimbals or gimbal rings, with each gimbal supported for rotation about a respective axis.

Gimbaled systems typically require periodic calibration and balancing in order to function optimally. However, gimbaled systems are often complex, and many sophisticated gimbaled systems (particularly multi-gimbal systems) may require external balancing equipment to achieve the desired calibration and balancing. For example, some gimbaled systems require the use of single-axis rotary tables or multi-axis articulators in order to rotate the gimbaled system about one or more axes during the calibration and balancing process. Such approaches may also require outside design work, software engineering, mechanical engineering, and multiple technician support in order to support the design, procurement, operation and maintenance of such single- or multi-axis external equipment.

SUMMARY

According to one embodiment, a method of balancing a gimbaled system is disclosed. The gimbaled system has a gimbal operatively connected with a motor configured to control a rotation of the gimbal, wherein the gimbal has predetermined compensation locations thereon. The method includes: tumbling the gimbal through a gravity field using the motor; sensing motor control current data from the motor; applying a polynomial fit filter to the motor control current data to produce smoothed current data; determining, from the smoothed current data, an imbalance condition of the gimbal characterized by an imbalance torque and an imbalance angle; and applying an optimization algorithm to determine an optimized combination of one or more compensating weights disposed at one or more of the predetermined compensation locations, wherein the optimized combination is effective to compensate for the imbalance condition.

The gimbal may be a stable member carrying a plurality of gyros and accelerometers. The imbalance torque may be determined from a range between an average maximum and an average minimum of the smoothed current data using characteristics of the motor, and the imbalance angle may correspond to a commanded angle associated with an average maximum and/or an average minimum of the smoothed current data. The polynomial fit filter may be a Savitzky-Golay filter, and it may preserve phase information from the motor control current data.

Tumbling the gimbal may include rotating the gimbal through 360 degrees of rotation, and the rotation of the gimbal may include an angular position and an angular speed of the gimbal. The optimization algorithm may optimize for at least one of (i) a lowest total weight of the one or more compensating weights and (ii) a total weight of the one or more compensating weights which most effectively compensates for the imbalance condition. The optimization algorithm may utilize the equation $W_u{}^*r = \sum_{i=1}^{n} \cos(\theta_i + \theta_{CA} - \theta) * r_i * W_i$, where: n is the number of predetermined compensation locations, $W_u{}^*r$ is a mass imbalance moment corresponding to the imbalance condition, $W_i$ is an $i^{th}$ compensating weight disposed at an $i^{th}$ of the predetermined compensation locations, $r_i$ is an $i^{th}$ average radius of the $i^{th}$ compensating weight from a centroid of the gimbal, $\theta = 270°$, $\theta_i$ is an angle between a major principal axis of the gimbal and the $i^{th}$ compensating weight, and $\theta_{CA}$ is a gimbal angle commanded by the motor at a minimum duty cycle.

According to another embodiment, a method of balancing a gimbaled system having a gimbal operatively connected with a motor configured to control an angular position and an angular speed of the gimbal, wherein the gimbal has predetermined compensation locations thereon, includes: (i) rotating the gimbal through 360 degrees within a gravity field using the motor; (ii) sensing motor control current data from the motor; (iii) applying a polynomial fit filter to the motor control current data to produce smoothed current data having phase information preserved from the motor control current data; (iv) determining, from the smoothed current data, an imbalance condition of the gimbal characterized by an imbalance torque and an imbalance angle; and (v) applying an optimization algorithm to determine an optimized combination of one or more compensating weights disposed at one or more of the predetermined compensation locations, wherein the optimized combination is effective to compensate for the imbalance condition.

The imbalance torque may be determined from a range between an average maximum and an average minimum of the smoothed current data using characteristics of the motor, and the imbalance angle may correspond to a commanded angle associated with an average maximum and/or an average minimum of the smoothed current data. The optimization algorithm may optimize for at least one of (i) a lowest total weight of the one or more compensating weights and (ii) a total weight of the one or more compensating weights which most effectively compensates for the imbalance condition. The optimization algorithm may utilize the equation $W_u{}^*r = \sum_{i=1}^{n} \cos(\theta_i + \theta_{CA} - \theta) * r_i * W_i$, where: n is the number of predetermined compensation locations, $W_u{}^*r$ is a mass imbalance moment corresponding to the imbalance condition, $W_i$ is an $i^{th}$ compensating weight disposed at an $i^{th}$ of the predetermined compensation locations, $r_i$ is an $i^{th}$ average radius of the $i^{th}$ compensating weight from a centroid of the gimbal, $\theta = 270°$, $\theta_i$ is an angle between a major principal axis of the gimbal and the $i^{th}$ compensating weight, and $\theta_{CA}$ is a gimbal angle commanded by the motor at a minimum duty cycle.

According to yet another embodiment, a system for balancing a gimbaled system is disclosed, wherein the gimbaled system includes a gimbal operatively connected with a motor configured to control a rotation of the gimbal, and wherein the gimbal has predetermined compensation locations thereon. The system includes: a tumbling module configured to interface with the motor to tumble the gimbal through a gravity field; a sensing module configured to sense motor control current data from the motor; a filter module configured to apply a polynomial fit filter to the motor control current data to produce smoothed current data having phase information preserved from the motor control current data; a determining module configured to determine, from the smoothed current data, an imbalance condition of the gimbal characterized by an imbalance torque and an imbalance angle; and an optimization module configured to apply an optimization algorithm to determine an optimized combination of one or more compensating weights disposed at one or more of the predetermined compensation locations, wherein the optimized combination is effective to compensate for the imbalance condition.

The imbalance angle may correspond to a commanded angle associated with an average maximum and/or an average minimum of the smoothed current data, and the imbalance torque may be determined from a range between an average maximum and an average minimum of the smoothed current data using characteristics of the motor. The optimization algorithm may optimize for at least one of (i) a lowest total weight of the one or more compensating weights and (ii) a total weight of the one or more compensating weights which most effectively compensates for the imbalance condition. The optimization algorithm may utilize the equation $W_u * r = \Sigma_{i=1}^{n} \cos(\theta_i + \theta_{CA} - \theta) * r_i * W_i$, where: n is the number of predetermined compensation locations, $W_u * r$ is a mass imbalance moment corresponding to the imbalance condition, $W_i$ is an $i^{th}$ compensating weight disposed at an $i^{th}$ of the predetermined compensation locations, $r_i$ is an $i^{th}$ average radius of the $i^{th}$ compensating weight from a centroid of the gimbal, $\theta = 270°$, $\theta_i$ is an angle between a major principal axis of the gimbal and the $i^{th}$ compensating weight, and $\theta_{CA}$ is a gimbal angle commanded by the motor at a minimum duty cycle.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
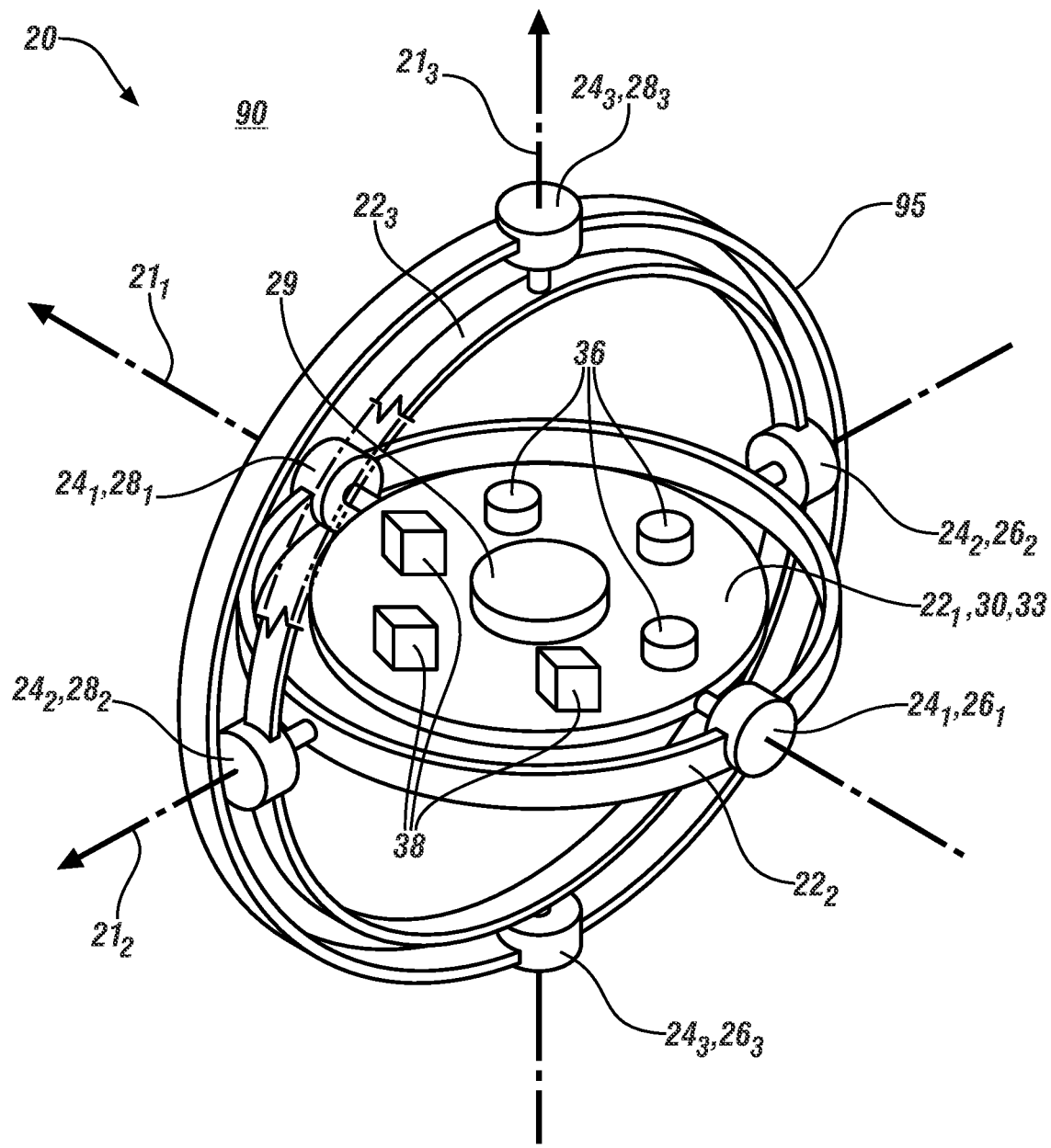
FIG. 1 is a schematic perspective view of a gimbaled system.

Referring now to the drawings, wherein like numerals indicate like parts in the several views, a system 100 for balancing a gimbaled system 20, and a method 200 for balancing a gimbaled system 20, are shown and described herein. Note that certain reference numerals in the drawings have subscripts, such as the three gimbals $22_1$, $22_2$ and $22_3$ shown in FIG. 1. Subscripts are used in the drawings and in the present description to refer to individual elements (such as each of the aforementioned gimbals), while the use of reference numerals without subscripts may refer to the collective group of such elements and/or to a singular but generic one of such elements. Thus, reference numeral $22_1$ refers to a specific gimbal, while reference numeral 22 (without the subscript) may refer to all the gimbals, the collective group of gimbals, or a singular but generic gimbal (i.e., any gimbal).

Figure 2:
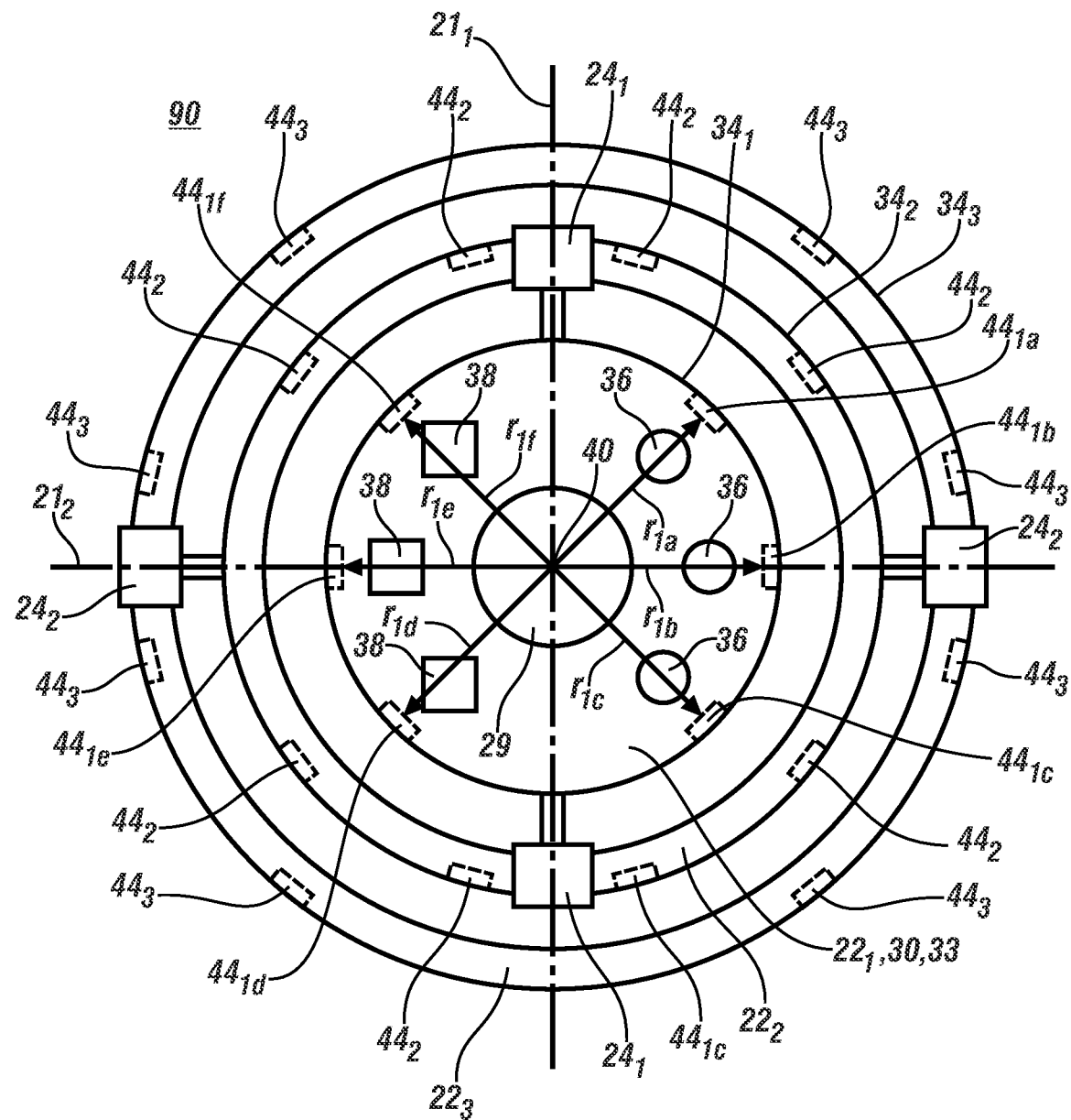
FIG. 2 is a schematic plan view of a portion of the gimbaled system of FIG. 1, with the first, second and third gimbals arranged in the same plane.
Figure 3:
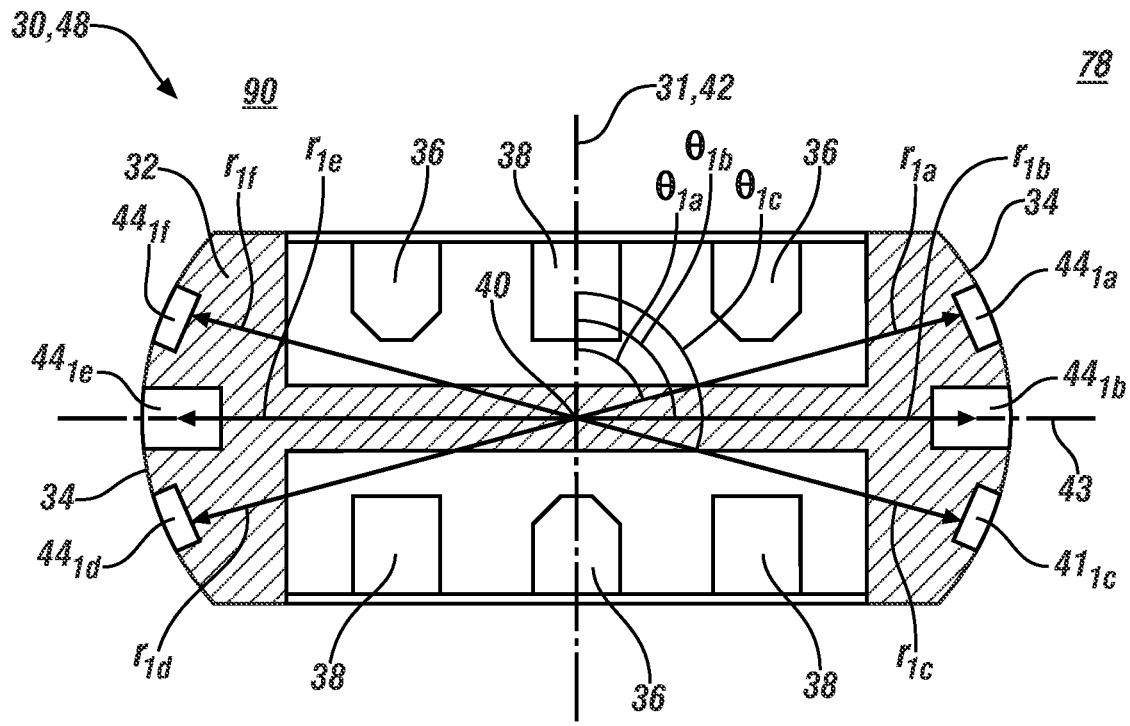
FIG. 3 is a schematic cross-sectional side view of a stable member of a gimbaled system in a first orientation.
Figure 4:
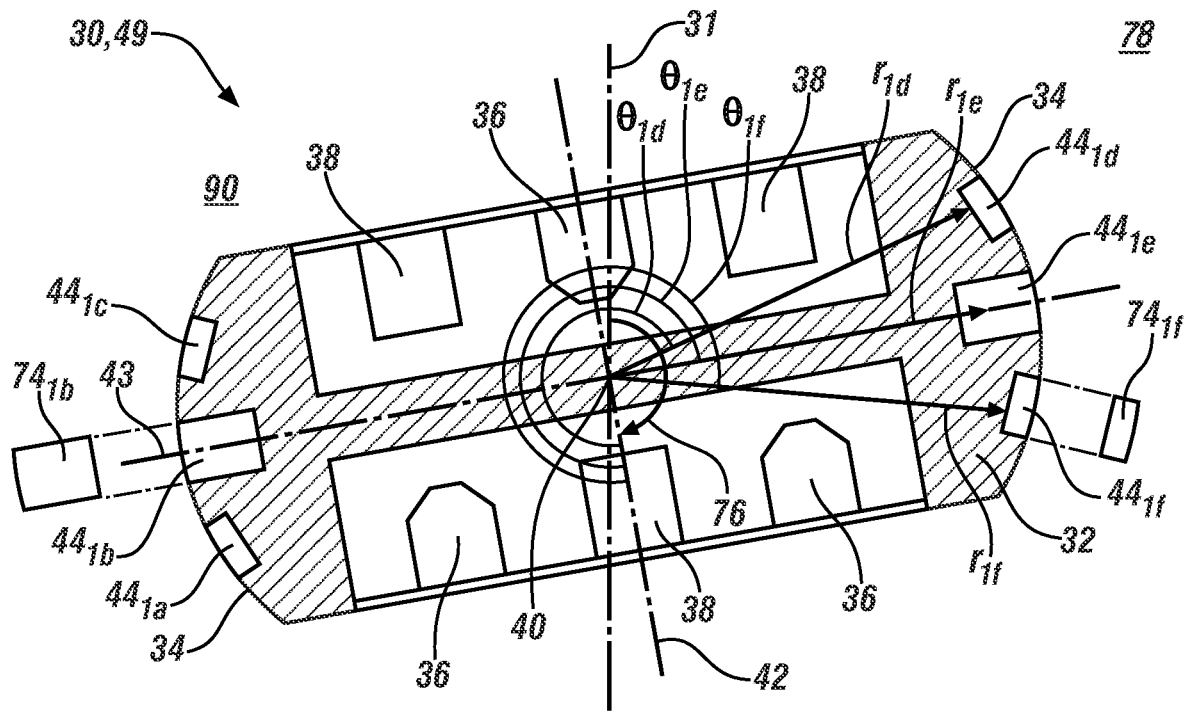
FIG. 4 is a schematic cross-sectional side view of the stable member of FIG. 3 in a second orientation.

FIG. 1 shows a schematic perspective view of an exemplary gimbaled system 20, such as may be used in an IMU. The gimbaled system 20 shown here has three gimbals $22_1$, $22_2$, $22_3$ for illustration purposes, but the system 100 and method 200 described herein equally apply to arrangements having one, two, four, or more gimbals 22. As illustrated in the exemplary gimbaled system 20, the gimbals 22 are concentrically nested such that a first or inner gimbal $22_1$ is surrounded by a second or middle gimbal $22_2$, and the second gimbal $22_2$ is surrounded by a third or outer gimbal $22_3$. The first gimbal $22_1$ may take the form of a stable member 30 configured as a generally flat platform or table 33 as shown in FIGS. 1-2, or as an enclosure or housing 32 as shown in FIGS. 3-4. In either configuration, the gimbals 22 are interconnected with each other (as further described below) such that during operation, the first gimbal $22_1$ or stable member 30 may be maintained in an unchanging orientation with respect to three mutually orthogonal spatial axes $21_1$, $21_2$, $21_3$, such as conventional x-, y- and z-axes. These axes 21 may be arbitrarily oriented with respect to any desired reference frame, including an inertial reference frame which corresponds to the roll, pitch and yaw motions of a system (e.g., an aircraft) in which the gimbaled system 20 is carried. As used herein, the first gimbal $22_1$ and the stable member 30 may be used interchangeably where the context allows.

The first gimbal $22_1$ or stable member 30 may contain or carry a plurality of gyros 36 and accelerometers 38. Each accelerometer 38 is configured and oriented so as to sense linear motion or acceleration along a respective axis 21, and each gyro 36 is configured and oriented so as to sense angular motion or velocity about a respective axis 21. The stable member 30 may also contain or carry one or more instrument packages 29 containing inclinometers, magnetometers, pendulum systems, prism systems, telemetry systems, computing systems, etc. The first gimbal $22_1$ or stable member 30 is pivotably connected to the surrounding second gimbal $22_2$ at two opposed pivots $24_1$. One of these pivots $24_1$ may include or take the form of a motor, servo or torquer $26_1$ which is configured to cause the first gimbal $22_1$ or stable member 30 to rotate with respect to the second gimbal $22_2$ along the axis $21_1$ which extends between the two pivots $24_1$. The other of these pivots $24_1$ may include or take the form of a resolver $28_1$ which is configured to instantaneously determine the angle formed between the first gimbal $22_1$ or stable member 30 and the second gimbal $22_2$, which will be between 0 and 360 degrees. Alternatively, one of the pivots $24_1$ may include or take the form of both the motor $26_1$ and the resolver $28_1$, with the other pivot $24_1$ serving only as a rotatable pivot point.

Similarly, the second gimbal $22_2$ is pivotably connected to the surrounding third gimbal $22_3$ at two opposed pivots $24_2$, with one of the pivots $24_2$ including or taking the form of a motor $26_2$ (which is configured to cause the second gimbal $22_2$ to rotate with respect to the third gimbal $22_3$ along the axis $21_2$ which extends between the two pivots $24_2$), and one of the pivots $24_2$ including or taking the form of a resolver $28_2$ which is configured to instantaneously determine the angle formed between the second gimbal $22_2$ and the third gimbal $22_3$. Likewise, the third gimbal $22_3$ is pivotably connected to a surrounding frame 95 (e.g., an aircraft frame) or other structure at two opposed pivots $24_3$, with one of the pivots $24_3$ including or taking the form of a motor $26_3$ (which is configured to cause the third gimbal $22_3$ to rotate with respect to the surrounding frame 95 along the axis $21_3$ which extends between the two pivots $24_3$), and one of the pivots $24_3$ including or taking the form of a resolver $28_3$ which is configured to instantaneously determine the angle formed between the third gimbal $22_3$ and the surrounding frame 95.

FIG. 2 shows a schematic plan view of a portion of the gimbaled system 20 of FIG. 1, with the first, second and third gimbals $22_1$, $22_2$, $22_3$ arranged in the same plane. In this view, note that a plurality of predetermined compensation locations (PCLs) 44 are formed in or about a perimeter, outer edge or outer boundary 34 of each gimbal 22. Each PCL 44 may take the form of a pocket or recess formed within the outer boundary 34 of each gimbal 22, and/or each PCL 44 may be a location on the surface of each gimbal 22 near each gimbal's respective outer boundary 34. In FIG. 2, the PCLs 44 are shown in dashed lines, signifying that they extend beneath the visible surface of the gimbals 22 as seen in this view; however, note that the PCLs 44 may also include the surface of the gimbals 22 near the outer boundary 34 which is visible in this view, as well as the opposite surface near the outer boundary 34 which is not visible in this view. Note that while the drawings and description herein describe the PCLs 44 as being at or near the outer boundary 34 of each gimbal 22, the PCLs 44 may also be located at or near the inner boundary of each gimbal 22, as well as anywhere on each gimbal 22 between the gimbal's outer boundary 34 and inner boundary.

The first gimbal $22_1$ or stable member 30 illustrated in FIG. 2 includes six PCLs $44_1$, but any number n of PCLs $44_1$ may be provided, where n≥2. For each gimbal 22, the PCLs 44 may be equally or evenly spaced apart from each other, or not. Similarly, the PCLs 44 may be arranged symmetrically with respect to one or more axes 21, or not. A respective radius $r_i$ extends from the centroid 40 of the first gimbal $22_1$ or stable member 30 to each PCL $44_1$ of the first gimbal $22_1$ or stable member 30. In FIG. 2, each radius $r_i$ is shown terminating at the edge of each PCL $44_1$, but each radius $r_i$ may alternatively terminate at some other portion of each PCL $44_1$ (e.g., in the middle of each PCL $44_1$). Subscripts "a" through "f" are used in the reference numerals to designate the six different PCLs $44_1$ and radii $r_1$ associated with the first gimbal $22_1$. For example, a first (or "a") PCL $44_1$ and radius $r_1$ are designated by reference numerals $44_{1a}$ and $r_{1a}$, respectively. Likewise, reference numerals $r_{1b}$, $r_{1c}$, $r_{1d}$, $r_{1e}$ and $r_{1f}$ refer to the second through sixth (or "b" through "f") radii $r_1$, respectively, and reference numerals $44_{1b}$, $44_{1c}$, $44_{1d}$, $44_{1e}$ and $44_{1f}$ refer to the second through sixth (or "b" through "f") PCLs $44_1$, respectively.

Note that the second and third gimbals $22_2$, $22_3$ are illustrated as each having eight PCLs $44_2$, $44_3$, formed adjacent a respective outer boundary $34_2$, $34_3$. As described above for the first gimbal $22_1$, the second and third gimbals $22_2$, $22_3$ may have any number n of PCLs $44_2$, $44_3$, where n≥2 for each gimbal $22_2$, $22_3$. Although not shown in the drawings, each PCL $44_2$ of the second gimbal $22_2$ has its own respective radius $r_2$, and each PCL $44_3$ of the third gimbal $22_3$ has its own respective radius $r_3$, as measured from the centroid or center of gravity 40 of the gimbaled system 20.

FIGS. 3-4 show schematic cross-sectional side views of another embodiment of the first gimbal $22_1$ having the form of a stable member 30 in first and second orientations 48, 49, respectively. In the first orientation 48, a major principal axis 42 of the stable member 30 extends through a centroid 40 of the stable member 30 and is colinearly aligned with a reference axis 31, which may be the first axis $22_1$. Alternatively, the reference axis 31 may be the second axis $22_2$, the third axis $22_3$, or another axis. In the illustrated embodiment, the stable member 30 has an enclosure or housing 32 in which a plurality of gyros 36 and accelerometers 38 are securely disposed. In one arrangement, three gyros 36 and three accelerometers 38 are used, with each gyro 36 and accelerometer 38 operatively aligned with respect to a respective one of the axes 22. The stable member 30 also includes a plurality of PCLs $44_1$ formed in or about a perimeter, outer edge or outer boundary 34 of the housing 32. Each PCL $44_1$ may take the form of a pocket or recess within the outer boundary 34 of the stable member 30. FIGS. 3-4 show a total of six PCLs $44_1$ (numbered $44_{1a}$, $44_{1b}$, $44_{1c}$, $44_{1d}$, $44_{1e}$ and $44_{1f}$), but any number n of PCLs $44_1$ may be provided, where n≥2. Respective radii $r_1$ (i.e., $r_{1a}$, $r_{1b}$, $r_{1c}$, $r_{1d}$, $r_{1e}$ and $r_{1f}$) extend from the centroid 40 to each PCL $44_1$. As described in more detail below in connection with the second orientation 49, one or more compensating weights 74 may be secured within one or more of the PCLs 44 in order to facilitate balancing and calibration of the gimbaled system 20. It should be noted that the first gimbal $22_1$ or stable member 30 of FIGS. 3-4 (which takes the form of a housing or enclosure 32) may be substituted for the first gimbal $22_1$ or stable member 30 of FIGS. 1-2 (which takes the form of a generally flat platform or table 33.)

With reference to FIGS. 3-9, a system 100 and method 200 for balancing a gimbaled system 20 will now be explained. The system 100 and method 200 each begin by executing a procedure to balance a first gimbal $22_1$, and then repeating the procedure as needed to separately balance each additional gimbal 22. (Alternatively, the system 100 and method 200 may begin with balancing a gimbal 22 other than a first gimbal $22_1$.)

FIG. 3 shows a beginning position or first orientation 48 for the first gimbal $22_1$. As discussed above, in the first orientation 48 the first gimbal $22_1$ is oriented with its major principal axis 42 aligned with (parallel to) a reference axis 31, which may be pointing straight up, away from the direction of the Earth's force of gravity. Using FIGS. 1-3 together as an example, the reference axis 31 may be the third axis $21_3$, which in FIG. 1 points straight up away from the Earth's downward force of gravity. In this first orientation 48, axis 43 of FIG. 3 (which is orthogonal to the major principal axis 42) would be aligned with axis $21_2$, and the first gimbal $22_1$ would be rotatable about axis $21_1$ by actuation of motor $26_1$.

Next, the first gimbal $22_1$ is tumbled or rotated about axis $21_1$ through a gravity field 90 (e.g., the Earth's gravity field) by using motor $26_1$. This tumbling or rotation is effected through a full 360 degrees of rotation, and may be cycled through numerous continuous rotations about axis $21_1$. The rotation of the first gimbal $22_1$ may include or produce an angular position 78 of the first gimbal $22_1$ and an angular speed 80 of the first gimbal $22_1$. FIG. 4 illustrates the first gimbal $22_1$ at a second orientation 49, which represents the orientation of the first gimbal $22_1$ at one particular moment in time. Here, the first gimbal $22_1$ is oriented such that the major principal axis 42 is about 172 degrees from the reference axis 31, corresponding to a commanded angle 76 (i.e., an angle which the motor 26₁ is commanded to be at momentarily, according to motor control signals sent to the motor 26₁).

Figure 5:
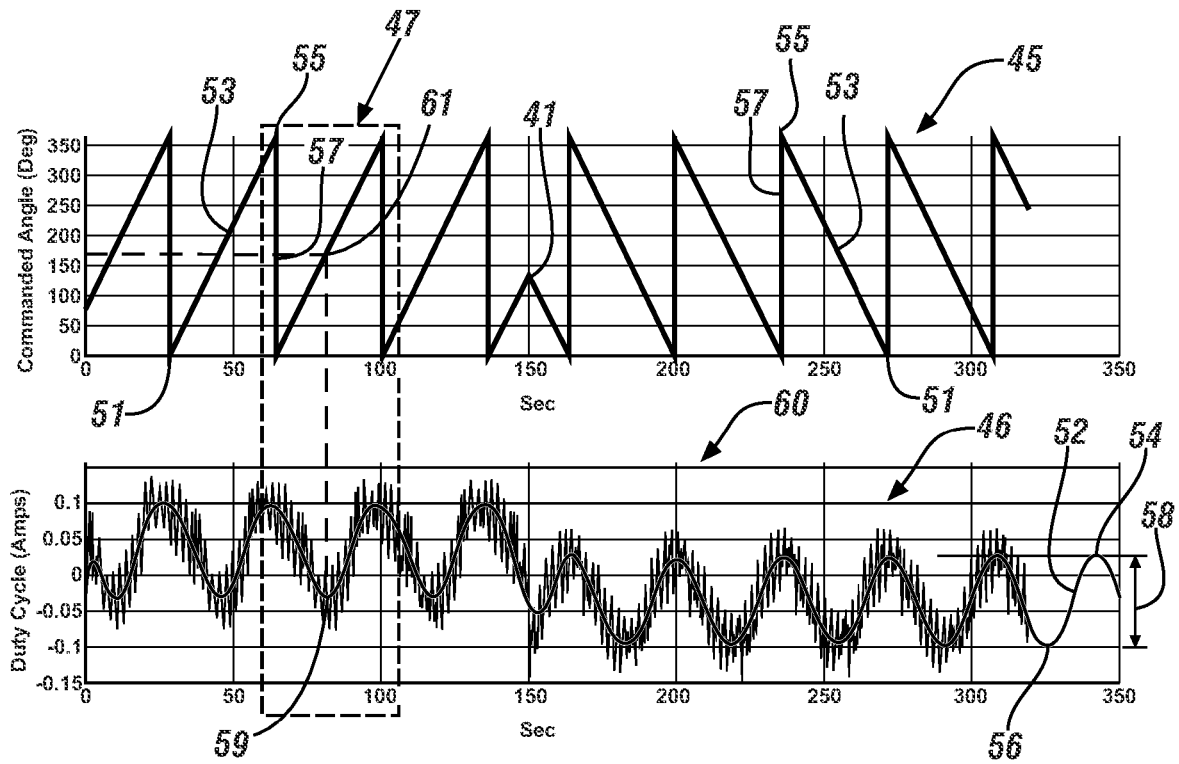
FIG. 5 shows correlated plots of commanded angle and duty cycle versus time before optimization.

FIG. 5 shows correlated plots of (i) the commanded angle 76 sent to the motor 26₁, and (ii) the duty cycle of the motor 26₁, both versus time, and before optimization and balancing. The commanded angle 76 changes over time and forms a commanded angle curve 45, which may have a somewhat sawtooth type of appearance. Note that the commanded angle curve 45 has a "vee" point 41 in the middle of the curve 45. The portion of the curve 45 to the left of the "vee" point 41 represents rotation of the first gimbal 22₁ through a first direction, and the portion to the right of the "vee" point 41 represents rotation of the first gimbal 22₁ in a second direction opposite of the first direction. (These first and second directions may be viewed as clockwise and counter-clockwise directions as viewed along axis 21₁.) On the left portion, the curve 45 cycles between 0 and 360 degrees continuously, going from a low point 51 corresponding to 0 degrees to a high point 55 corresponding to 360 degrees along a generally straight path 53, and then dropping from 360 to 0 degrees along vertical line 57 (signifying an instantaneous switchover from 360 degrees to 0 degrees) to continue on with the next cycle until the "vee" point 41 is reached. At the "vee" point 41, the rotation or tumbling is reversed in direction, with the curve 45 then proceeding from high point 55 corresponding to 360 degrees to low point 51 corresponding to 0 degrees along generally straight path 53, and then rising up from 0 to 360 degrees along vertical line 57 and continuing on with the next cycle until it is determined that sufficient cycles have been run.

Figure 6:
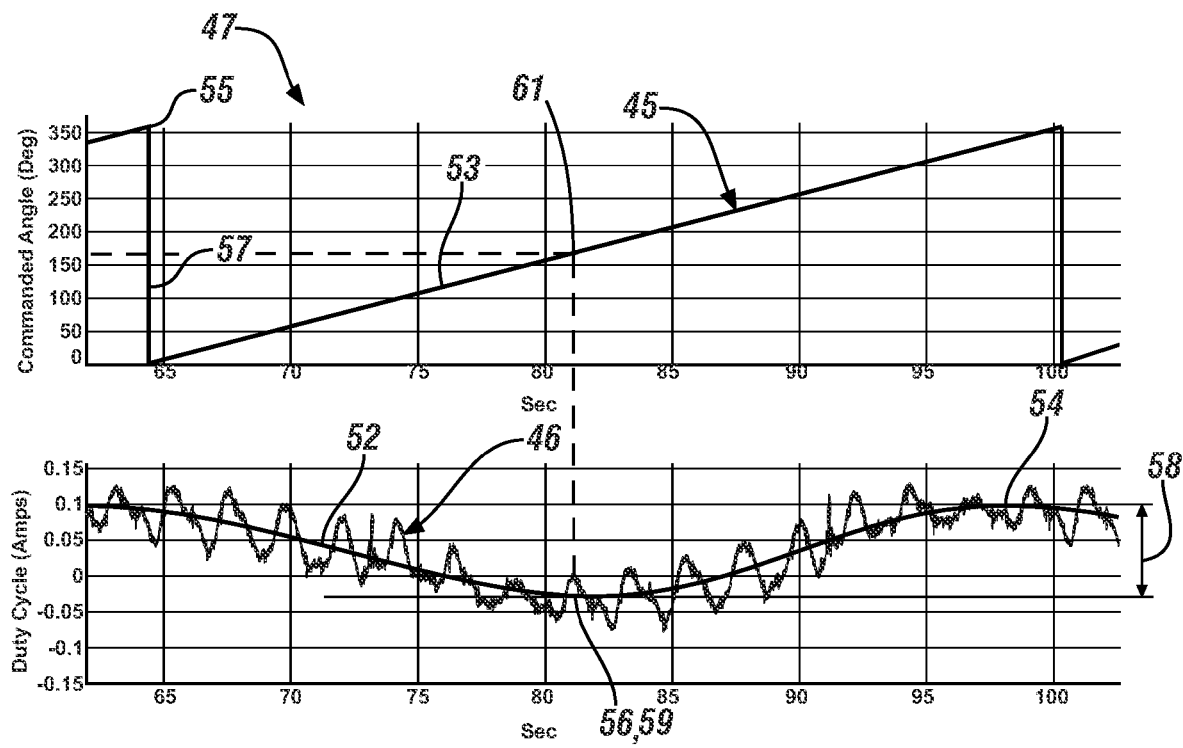
FIG. 6 shows a close-up view of the correlated plots within the dashed rectangle of FIG. 5.

The bottom of FIG. 5 shows motor control current data 46 that is sensed and optionally recorded from the motor 26₁ which is rotating the first gimbal 22₁. This data 46 may include or be derived from back EMF (i.e., electromotive force, or voltage) and/or other signal characteristics which may be read or inferred from the motor 26₁. FIG. 6 shows a close-up view of the correlated plots of the commanded angle curve 45 and motor control current data 46 within the dashed rectangle 47 of FIG. 5. The noisy or oscillatory nature of the motor control current data 46 can be filtered or smoothed to produce smoothed current data 52 by applying a polynomial fit filter 50 to the motor control current data 46. The polynomial fit filter 50 may be a Savitzky-Golay filter or other suitable filter or algorithm which preserves phase information 60 from the motor control current data 46. The smoothed current data 52 will have an average maximum 54, an average minimum 56, and a range 58 between the average maximum and minimum 54, 56, each having units of amps. (Note that a portion of the motor control current data 46 on the bottom-righthand side of FIG. 5 has been suppressed (i.e., not shown) in order to more clearly show the smoothed current data 52, average maximum 54, average minimum 56 and range 58 at that location.)

Next, an imbalance condition 62 of the first gimbal 22₁ is determined from the smoothed current data 52. The imbalance condition 62 is characterized by an imbalance angle 66 and an imbalance torque 64. The imbalance angle 66 corresponds to a commanded angle 76 associated with the average maximum 54 and/or the average minimum 56 of the smoothed current data 52, while the imbalance torque 64 is determined from the range 58 between the average maximum 54 and the average minimum 56 using characteristics 68 of the motor 26₁. These motor characteristics 68 may include one or more operating characteristics and specifications of the motor 26₁ such as (i) the dimensions of the rotating shaft, (ii) the voltage, current, cycles per second and waveforms input into the motor 26₁, (iii) the resulting rotational motions (e.g., angular position, velocity and acceleration) and rotational forces (i.e., torques or moments) produced by the motor 26₁ in response to (i) and (ii), and (iv) the efficiency and lag/latency of the motor 26₁. For example, FIGS. 5-6 show point 59 which is the same as the average minimum 56 for the portion of the smoothed current data 52 that is on the left side of the "vee" point 41 (and within the dashed rectangle 47 of FIG. 5). This point 56, 59 occurs at a "valley", local minimum or low point on the smoothed current data curve 52. Following the dashed vertical line upward from point 56, 59, it can be seen that this point 56, 59 corresponds to point 61 on the commanded angle curve 45. Then, following the dashed horizontal line from point 61 to the left axis, it can be seen that point 61 is at about 172 degrees (which also happens to be same as the commanded angle 76 at which the stable member 30 is shown in its second orientation 49 in FIG. 4). Thus, when the motor 26₁ is rotating the first gimbal 22₁ through full, continuous, repeated 360-degree cycles in the first direction, the duty cycle of the motor 26₁ (as indicated by the smoothed current data 52) is at an average minimum 56 at each commanded angle 76 of 172 degrees. This commanded angle 76 of 172 degrees represents the imbalance angle 66. The imbalance torque 64, in turn, may be calculated using the range 58 and the motor characteristics 68 of the motor 26₁. Together, the imbalance angle 66 and imbalance torque 64 characterize the imbalance condition 62. Note that the above approach and calculations may also be performed for rotation of the first gimbal 22₁ in the second direction as well.

After the imbalance condition 62 has been determined, an optimization algorithm 70 is applied to determine an optimized combination 72 of one or more compensating weights 74 that may be added and secured at one or more of the PCLs 44, such that the optimized combination 72 is effective to compensate for the imbalance condition 62. This compensation may minimize, mitigate or eliminate the imbalance condition 62. In some arrangements, the locations and sizes (e.g., volumes) of the PCLs 44 may be limited or may be dictated by design and packaging considerations, and/or the compensating weights 74 may likewise be limited or available only in particular predetermined sizes and weights, such that an ideal solution may not be possible, thus requiring that the combination 72 of locations and weights for the one or more compensating weights 74 be optimized. For example, the optimization algorithm 70 may optimize for one or both of the following: (i) a lowest total weight of the one or more compensating weights 74, and (ii) a total weight of the one or more compensating weights 74 which most effectively compensates for the imbalance condition 62.

The optimization algorithm 70 may utilize the equation $W_u * r = \Sigma_{i=1}^{n} \cos(\theta_i + \theta_{CA} \theta) * r_i * W_i$, where: n is the number of PCLs 44, $W_u * r$ is a mass imbalance moment corresponding to the imbalance condition 62, $W_i$ is an $i^{th}$ compensating weight 74 disposed at an $i^{th}$ of the PCLs 44, $r_i$ is an $i^{th}$ average radius of the $i^{th}$ compensating weight 74 from a centroid 40 of the first gimbal 22₁, θ=270°, $\theta_i$ is an angle between the major principal axis 42 and the $i^{th}$ compensating weight 74, and $\theta_{CA}$ is a gimbal angle commanded by the motor 26₁ at a minimum duty cycle (e.g., corresponding to where the average minimum 56 and/or minimum point(s) 59 occur). Alternatively, the optimization algorithm 70 may utilize an equation, algorithm or procedure which provides a result that is equivalent to that of the abovementioned equation. Using the first gimbal 22₁ as an example, the optimization algorithm 70 may check multiple combinations of one or more compensating weights 74 at the six PCLs 44, and may choose an optimized or best solution according to whether the optimization is focused on finding (i) the lowest total weight of the one or more compensating weights 74, and/or (ii) the total weight of the one or more compensating weights 74 which most effectively compensates for the imbalance condition 62.

Figure 7:
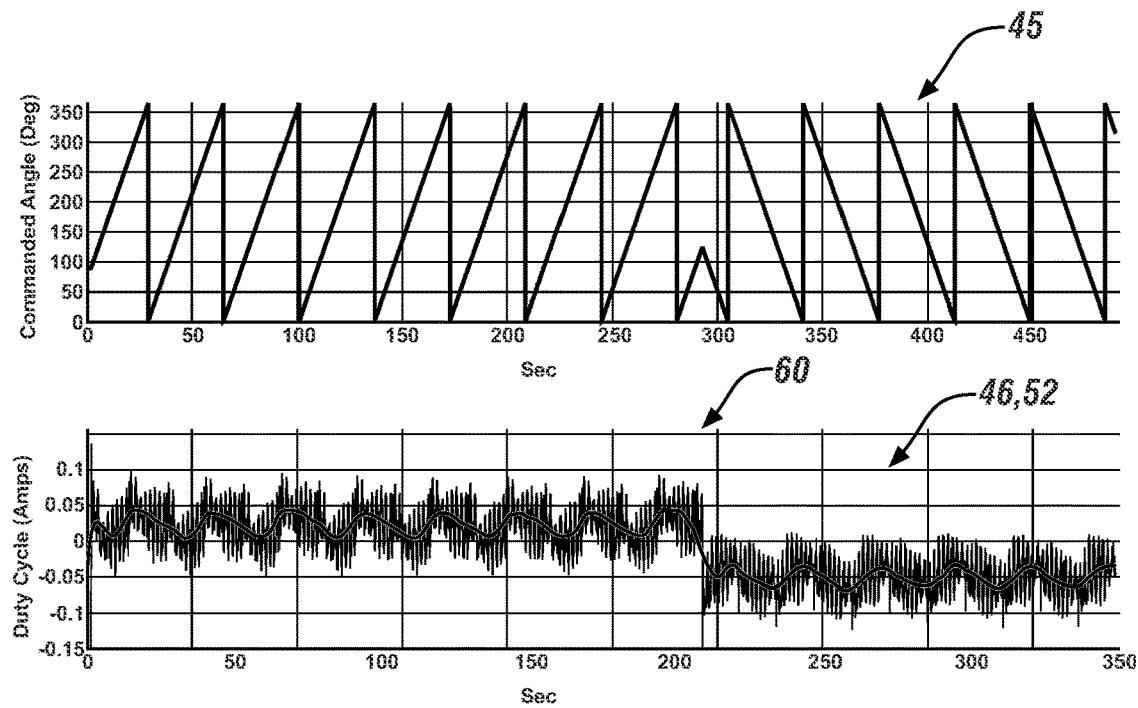
FIG. 7 shows correlated plots of commanded angle and duty cycle versus time after optimization.

FIG. 7 shows correlated plots of (i) the commanded angle 76 sent to the motor $26_1$, and (ii) the duty cycle of the motor $26_1$, both versus time, but after optimization and balancing of the first gimbal $22_1$. The process described above may be repeated as desired for the first gimbal $22_1$, as well as for each additional gimbal 22, in order to more finely balance the gimbaled system 20

Figure 9:
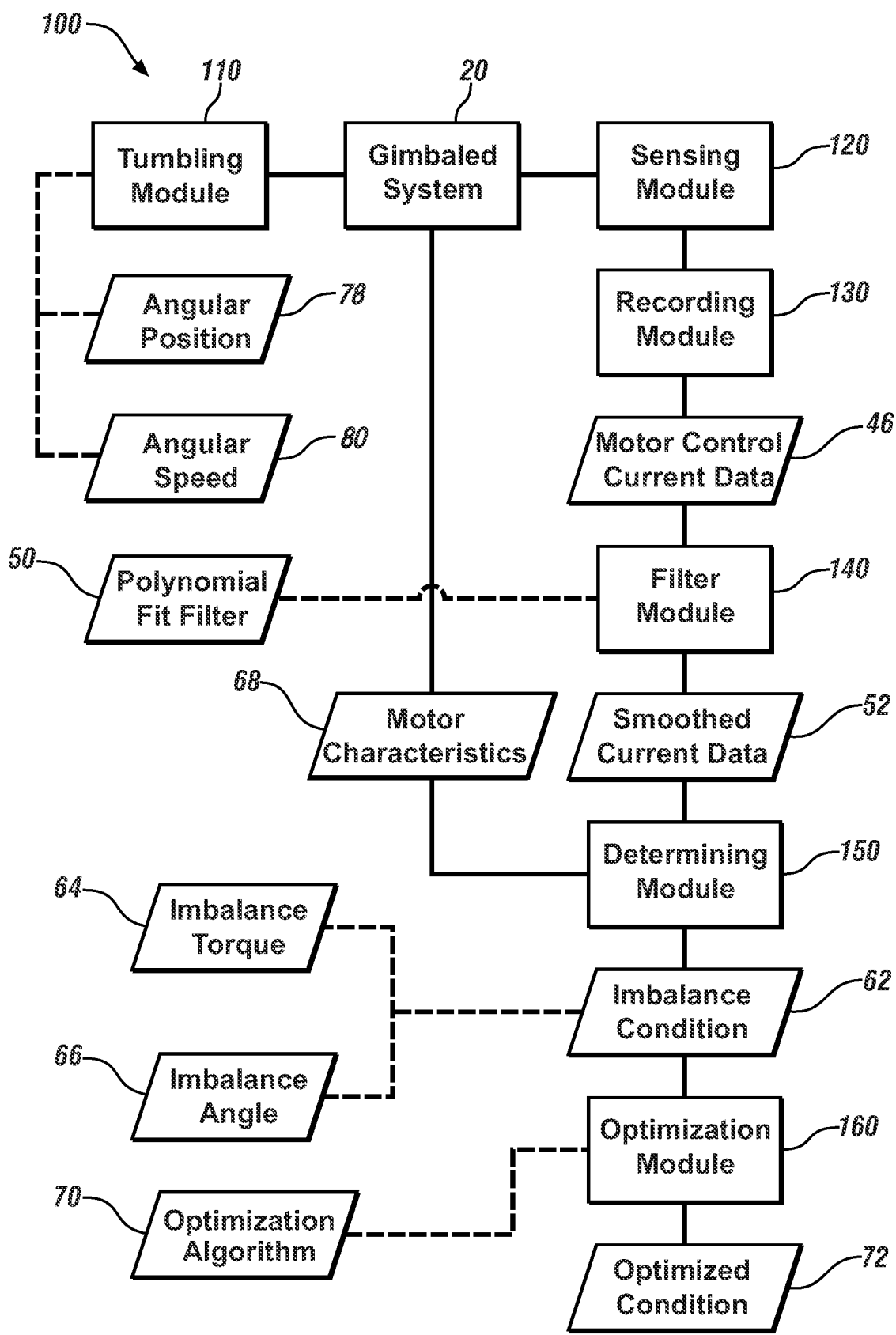
FIG. 9 is a flowchart of a method of balancing a gimbaled system.

FIG. 9 shows a block diagram of a system 100 which may be used for balancing a gimbaled system 20. The gimbaled system 20 includes a gimbal 22 operatively connected with a motor 26 configured to control a rotation of the gimbal 22, wherein the gimbal 22 has a plurality of PCLs 44 thereon. The system 100 includes a tumbling module 110 configured to interface with the motor 26 of the gimbaled system 20 to tumble the gimbal 22 through a gravity field 90. (The tumbling of the gimbal 22 may include or produce an angular position 78 of the gimbal 22 and an angular speed 80 of the gimbal 22.) A sensing module 120 interfaces with the motor 26 to sense and/or receive motor control current data 46 from the motor 26. A recording module 130 interfaces with the sensing module 120 and is configured to receive the motor control current data 26 from the sensing module 120. Alternatively, the recording module 130 may interface directly with the motor 26 and may be configured to sense and/or record the motor control current data 26 directly from the motor 26. Thus, the system 100 may exclude the sensing module 120, or it may include the sensing module 120. (As a further alternative, the system 100 may exclude the recording module 130; in such a configuration, the recording of the motor control current data 26 may be skipped, or it may be incorporated into the sensing module 120.) In any case, if a "recording" of the motor control current data 26 is performed, the recording may be transitory (e.g., held in a register, a buffer or in volatile memory), or non-transitory (e.g., copied or placed into non-volatile memory), or both. A filter module 140 interfaces with the sensing module 120 and/or the recording module 130 and is configured to apply a polynomial fit filter 50 to the motor control current data 46 to produce smoothed current data 52 having phase information 60 preserved from the motor control current data 46. A determining module 150 interfaces with the filter module 140 and is configured to determine, from the smoothed current data 52, an imbalance condition 62 of the gimbal 22 characterized by an imbalance torque 64 and an imbalance angle 66. Finally, an optimization module 160 interfaces with the determining module 150 and is configured to apply an optimization algorithm 70 to determine an optimized combination 72 of one or more compensating weights 74 disposed at one or more of the PCLs 44, wherein the optimized combination 72 is effective to compensate for the imbalance condition 62. Each of the abovementioned modules may include suitable combinations of hardware and software to accomplish each module's respective intended purpose.

In this system 100, the imbalance angle 66 may correspond to a commanded angle 76 associated with an average maximum 54 and/or an average minimum 56 of the smoothed current data 52, and the imbalance torque 64 may be determined from a range 58 between the average maximum 54 and average minimum 56 of the smoothed current data 52 using characteristics 68 of the motor 26. The system 100 may utilize the optimization algorithm 70 to optimize (i) a lowest total weight of the one or more compensating weights 74, or (ii) a total weight of the one or more compensating weights 74 which most effectively compensates for the imbalance condition 62, or both (i) and (ii). As similarly discussed above, the optimization algorithm 70 may utilize the equation $W_u * r = \Sigma_{i=1}^{n} \cos(\theta_i + \theta_{CA} - \theta) * r_i * W_i$, where: n is the number of PCLs 44, $W_u * r$ is a mass imbalance moment corresponding to the imbalance condition 62, $W_i$ is an $i^{th}$ compensating weight 74 disposed at an $i^{th}$ of the PCLs 44, $r_i$ is an $i^{th}$ average radius of the $i^{th}$ compensating weight 74 from a centroid 40 of the gimbal 22, $\theta = 270°$, $\theta_i$ is an angle between a major principal axis 42 of the gimbal 22 and the $i^{th}$ compensating weight 74, and $\theta_{CA}$ is a gimbal angle commanded by the motor 26 at a minimum duty cycle.

Figure 8:
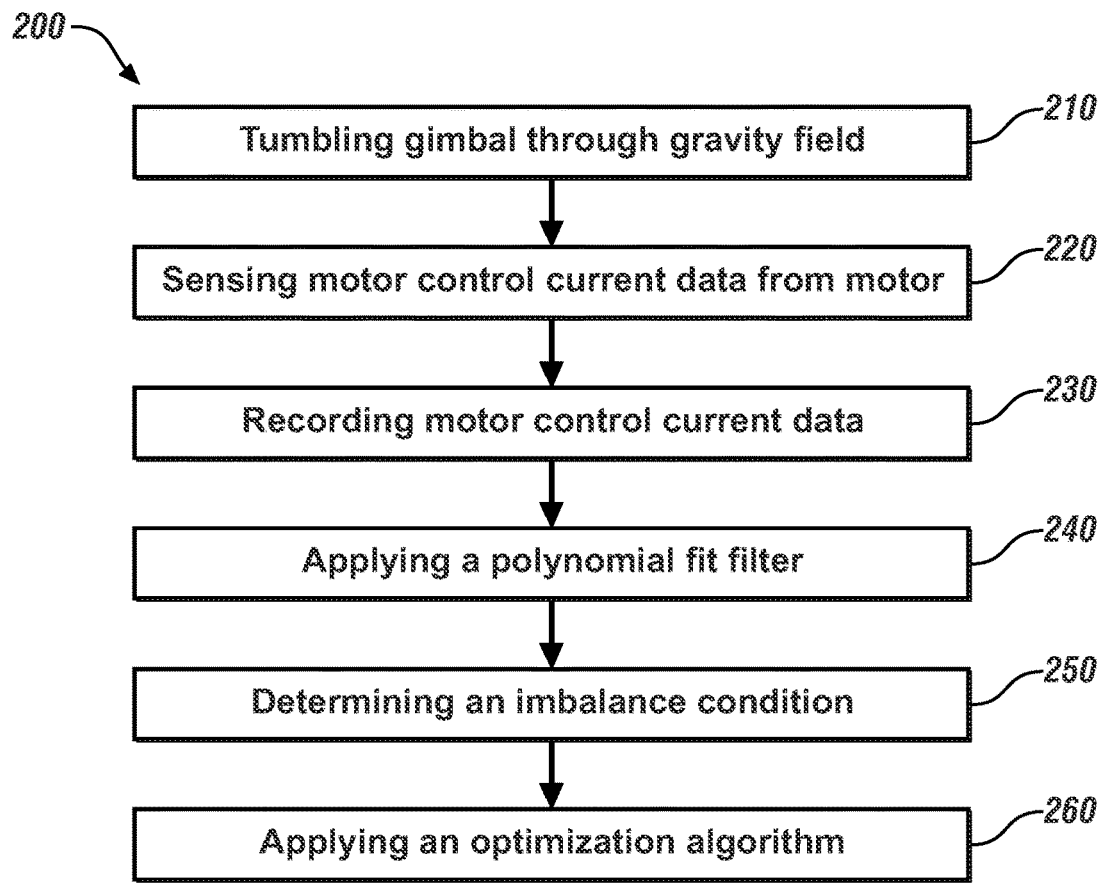
FIG. 8 is a block diagram of a system for balancing a gimbaled system.

FIG. 8 shows a flowchart of a method 200 of balancing a gimbaled system 20, which complements the abovementioned system 100 for balancing a gimbaled system 20. As described above, the gimbaled system 20 has a gimbal 22 operatively connected with a motor 26 configured to control a rotation of the gimbal 22, wherein the gimbal 22 has a plurality of PCLs 44 thereon. At block 210, the gimbal 22 is tumbled through a gravity field 90 using the motor 26. At block 220, motor control current data 46 is sensed from the motor 26. At block 230, the motor control current data 46 from the motor 26 is recorded. At block 240, a polynomial fit filter 50 is applied to the motor control current data 46 to produce smoothed current data 52. At block 250, an imbalance condition 62 of the gimbal 22 is determined, from the smoothed current data 52, with the imbalance condition 62 being characterized by an imbalance torque 64 and an imbalance angle 66. And at block 260, an optimization algorithm 70 is applied to determine an optimized combination 72 of one or more compensating weights 74 disposed at one or more of the PCLs 44, wherein the optimized combination 72 is effective to compensate for the imbalance condition 62.

In this method 200, the gimbal 22 may be a stable member 30 carrying a plurality of gyros 36 and accelerometers 38. The polynomial fit filter 50 may be a Savitzky-Golay filter, and the polynomial fit filter 50 may preserve phase information 60 from the motor control current data 46. In the method 200, the step of tumbling the gimbal 22 may include rotating the gimbal 22 through 360 degrees of rotation, and the rotation of the gimbal 22 may include or produce an angular position 78 and an angular speed 80 of the gimbal 22. The imbalance torque 64 may be determined from a range 58 between an average maximum 54 and an average minimum 56 of the smoothed current data 52 using characteristics 68 of the motor 26. The imbalance angle 66 may correspond to a commanded angle 76 associated with the average maximum 54 and/or the average minimum 56 of the smoothed current data 52. The optimization algorithm 70 may optimize for at least one of (i) a lowest total weight of the one or more compensating weights 74 and (ii) a total weight of the one or more compensating weights 74 which most effectively compensates for the imbalance condition 62. The optimization algorithm 70 may utilize the equation $W_u * r = \cos(\theta_i + \theta_{CA} - \theta) * r_i * W_i$, where: n is the number of PCLs 44, $W_u * r$ is a mass imbalance moment corresponding to the imbalance condition 62, $W_i$ is an $i^{th}$ compensating weight 74 disposed at an $i^{th}$ of the PCLs 44, $r_i$ is an $i^{th}$ average radius of the $i^{th}$ compensating weight 74 from a centroid 40 of the gimbal 22, $\theta = 270°$, $\theta_i$ is an angle between a major principal axis 42 of the gimbal 22 and the $i^{th}$ compensating weight 74, and $\theta_{CA}$ is a gimbal angle commanded by the motor 26 at a minimum duty cycle.

FIG. 8 also illustrates an alternative embodiment of a method 200 of balancing a gimbaled system 20. In this alternative embodiment, the gimbaled system 20 has a gimbal 22 operatively connected with a motor 26 configured to control an angular position 78 and an angular speed 80 of the gimbal 22, wherein the gimbal 22 has a plurality of predetermined compensation locations 44 thereon. At block 210, the gimbal 22 is rotated through 360 degrees within a gravity field 90 using the motor 26. At block 220, motor control current data 46 is sensed from the motor 26. At block 230, the motor control current data 46 from the motor 26 is recorded. At block 240, a polynomial fit filter 50 is applied to the motor control current data 46 to produce smoothed current data 52 having phase information 60 preserved from the motor control current data 46. At block 250, an imbalance condition 62 of the gimbal 22 is determined, from the smoothed current data 52, with the imbalance condition 62 being characterized by an imbalance torque 64 and an imbalance angle 66. And at block 260, an optimization algorithm 70 is applied to determine an optimized combination 72 of one or more compensating weights 74 disposed at one or more of the predetermined compensation locations 44, wherein the optimized combination 72 is effective to compensate for the imbalance condition 62.

In this alternative embodiment of the method 200, the imbalance torque 64 may be determined from a range 58 between an average maximum 54 and an average minimum 56 of the smoothed current data 52 using characteristics 68 of the motor 26, and the imbalance angle 66 may correspond to a commanded angle 76 associated with the average maximum 54 and/or the average minimum 56 of the smoothed current data 52. The optimization algorithm 70 may optimize for one or more of (i) a lowest total weight of the one or more compensating weights 74 and (ii) a total weight of the one or more compensating weights 74 which most effectively compensates for the imbalance condition 62. The optimization algorithm 70 may utilize the equation $W_u * r = \cos(\theta_i + \theta_{CA} - \theta) * r_i * W_i$, where: n is the number of PCLs 44, $W_u * r$ is a mass imbalance moment corresponding to the imbalance condition 62, $W_i$ is an $i^{th}$ compensating weight 74 disposed at an $i^{th}$ of the PCLs 44, $r_i$ is an $i^{th}$ average radius of the $i^{th}$ compensating weight 74 from a centroid 40 of the gimbal 22, $\theta=270°$, $\theta_i$ is an angle between a major principal axis 42 of the gimbal 22 and the $i^{th}$ compensating weight 74, and $\theta_{CA}$ is a gimbal angle commanded by the motor 26 at a minimum duty cycle.

Note that references herein to the "motor" and/or to reference numeral 26 may include the motor, servo or torquer and/or the controller for the motor, servo or torquer. Thus, the motor control current data 46 may be sensed and/or recorded from the motor, servo or torquer and/or from the controller for the motor, servo or torquer.

The system 100 and method 200 of the present disclosure provide many advantages over previously known approaches, including obviating the need for any external equipment to achieve balance. For example, the system 100 and method 200 do not require the use of single-axis rotary tables or multi-axis articulators. Thus, the system 100 and method 200 also do not require the outside design work, software engineering, mechanical engineering, and multiple technician support needed to design, procure, operate and maintain such single- or multi-axis external equipment.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of balancing a gimbaled system having a gimbal operatively connected with a motor configured to control a rotation of the gimbal, wherein the gimbal has predetermined compensation locations thereon, the method comprising:
    tumbling the gimbal through a gravity field via actuation of the motor,
        wherein the tumbling comprises rotating the gimbal via actuation of the motor;
    sensing motor control current data from the motor when the gimbal is tumbling;
    applying a polynomial fit filter to the motor control current data to produce smoothed current data;
    determining, from the smoothed current data, an imbalance condition of the gimbal characterized by an imbalance torque and an imbalance angle; and
    applying an optimization algorithm to determine an optimized combination of one or more compensating weights disposed at one or more of the predetermined compensation locations, wherein the optimized combination is configured to compensate for the imbalance condition.

2. The method of claim 1, wherein the gimbal is a stable member carrying a plurality of gyros and accelerometers.

3. The method of claim 1, wherein the imbalance torque is determined from a range between an average maximum and an average minimum of the smoothed current data using characteristics of the motor.

4. The method of claim 1, wherein the imbalance angle corresponds to a commanded angle associated with an average maximum and/or an average minimum of the smoothed current data.

5. The method of claim 1, wherein the polynomial fit filter preserves phase information from the motor control current data.

6. The method of claim 1, wherein tumbling the gimbal comprises rotating the gimbal through 360 degrees of rotation.

7. The method of claim 1, wherein the rotation of the gimbal includes an angular position and an angular speed of the gimbal.

8. The method of claim 1, wherein the optimization algorithm optimizes for at least one of (i) a lowest total weight of the one or more compensating weights and (ii) a total weight of the one or more compensating weights which most effectively compensates for the imbalance condition.

9. The method of claim 1, wherein the optimization algorithm utilizes an equation $W_u*r=\Sigma_{i=1}^{n} \cos(\theta_i+\theta_{CA}-\theta)*r_i*W_i$, where:
   n=number of predetermined compensation locations,
   $W_u*r$=a mass imbalance moment corresponding to the imbalance condition,
   $W_i$ is an $i^{th}$ compensating weight disposed at an $i^{th}$ of the predetermined compensation locations,
   $r_i$ is an $i^{th}$ average radius of the $i^{th}$ compensating weight from a centroid of the gimbal,
   $\theta=270°$,
   $\theta_i$ is an angle between a major principal axis of the gimbal and the $i^{th}$ compensating weight, and
   $\theta_{CA}$=a gimbal angle commanded by the motor at a minimum duty cycle.

10. The method of claim 1, wherein the one or more compensating weights are at least one of added or secured at the one or more of the predetermined compensation locations based on the determined optimized combination.

11. A method of balancing a gimbaled system having a gimbal operatively connected with a motor configured to control an angular position and an angular speed of the gimbal, wherein the gimbal has predetermined compensation locations thereon, the method comprising:
   rotating the gimbal through 360 degrees within a gravity field via actuation of the motor;
   sensing motor control current data from the motor when the gimbal is rotating;
   applying a polynomial fit filter to the motor control current data to produce smoothed current data having phase information preserved from the motor control current data;
   determining, from the smoothed current data, an imbalance condition of the gimbal characterized by an imbalance torque and an imbalance angle; and
   applying an optimization algorithm to determine an optimized combination of one or more compensating weights disposed at one or more of the predetermined compensation locations, wherein the optimized combination is configured to compensate for the imbalance condition.

12. The method of claim 11, wherein the imbalance torque is determined from a range between an average maximum and an average minimum of the smoothed current data using characteristics of the motor.

13. The method of claim 11, wherein the imbalance angle corresponds to a commanded angle associated with an average maximum and/or an average minimum of the smoothed current data.

14. The method of claim 11, wherein the optimization algorithm optimizes for at least one of (i) a lowest total weight of the one or more compensating weights and (ii) a total weight of the one or more compensating weights which most effectively compensates for the imbalance condition.

15. The method of claim 11, wherein the optimization algorithm utilizes an equation $W_u*r=\Sigma_{i=1}^{n} \cos(\theta_i+\theta_{CA}-\theta)*r_i*W_i$, where:
   n=number of predetermined compensation locations,
   $W_u*r$=a mass imbalance moment corresponding to the imbalance condition,
   $W_i$ is an $i^{th}$ compensating weight disposed at an $i^{th}$ of the predetermined compensation locations,
   $r_i$ is an $i^{th}$ average radius of the $i^{th}$ compensating weight from a centroid of the gimbal,
   $\theta=270°$,
   $\theta_i$ is an angle between a major principal axis of the gimbal and the $i^{th}$ compensating weight, and
   $\theta_{CA}$=a gimbal angle commanded by the motor at a minimum duty cycle.

16. A system for balancing a gimbaled system, wherein the gimbaled system includes a gimbal operatively connected with a motor configured to control a rotation of the gimbal, and wherein the gimbal has predetermined compensation locations thereon, the system comprising:
   a tumbling module configured to interface with the motor to tumble the gimbal through a gravity field via actuation of the motor,
      wherein the tumbling comprises rotating the gimbal via actuation of the motor;
   a sensing module configured to sense motor control current data from the motor when the gimbal is tumbling;
   a filter module configured to apply a polynomial fit filter to the motor control current data to produce smoothed current data having phase information preserved from the motor control current data;
   a determining module configured to determine, from the smoothed current data, an imbalance condition of the gimbal characterized by an imbalance torque and an imbalance angle; and
   an optimization module configured to apply an optimization algorithm to determine an optimized combination of one or more compensating weights disposed at one or more of the predetermined compensation locations, wherein the optimized combination is configured to compensate for the imbalance condition.

17. The system of claim 16, wherein the imbalance torque is determined from a range between an average maximum and an average minimum of the smoothed current data using characteristics of the motor.

18. The system of claim 16, wherein the imbalance angle corresponds to a commanded angle associated with an average maximum and/or an average minimum of the smoothed current data.

19. The system of claim 16, wherein the optimization algorithm optimizes for at least one of (i) a lowest total weight of the one or more compensating weights and (ii) a total weight of the one or more compensating weights which most effectively compensates for the imbalance condition.

20. The system of claim 16, wherein the optimization algorithm utilizes an equation $W_u*r=\Sigma_{i=1}^{n} \cos(\theta_i+\theta_{CA}-\theta)*r_i*W_i$, where:
   n=number of predetermined compensation locations,
   $W_u*r$=a mass imbalance moment corresponding to the imbalance condition,
   $W_i$ is an $i^{th}$ compensating weight disposed at an $i^{th}$ of the predetermined compensation locations,
   $r_i$ is an $i^{th}$ average radius of the $i^{th}$ compensating weight from a centroid of the gimbal,
   $\theta=270°$,
   $\theta_i$ is an angle between a major principal axis of the gimbal and the $i^{th}$ compensating weight, and $θ_{CA}$=a gimbal angle commanded by the motor at a minimum duty cycle.

* * * * *